May 24, 1966  M. SKOBEL  3,253,073
METHOD AND APPARATUS FOR MAKING A STRETCHABLE TAPE PRODUCT
Filed April 13, 1965  6 Sheets-Sheet 1

INVENTOR.
MAX SKOBEL
BY
ATTORNEY

May 24, 1966    M. SKOBEL    3,253,073
METHOD AND APPARATUS FOR MAKING A STRETCHABLE TAPE PRODUCT
Filed April 13, 1965    6 Sheets-Sheet 2

INVENTOR.
MAX SKOBEL
BY
ATTORNEY

May 24, 1966    M. SKOBEL    3,253,073
METHOD AND APPARATUS FOR MAKING A STRETCHABLE TAPE PRODUCT
Filed April 13, 1965    6 Sheets-Sheet 3

INVENTOR.
MAX SKOBEL
BY
ATTORNEYS.

May 24, 1966 M. SKOBEL 3,253,073
METHOD AND APPARATUS FOR MAKING A STRETCHABLE TAPE PRODUCT
Filed April 13, 1965 6 Sheets-Sheet 4

INVENTOR
MAX SKOBEL

BY Connolly and Hutz
ATTORNEYS

May 24, 1966 M. SKOBEL 3,253,073
METHOD AND APPARATUS FOR MAKING A STRETCHABLE TAPE PRODUCT
Filed April 13, 1965 6 Sheets-Sheet 5

FIG. 16.

INVENTOR
MAX SKOBEL

BY Connolly and Hutz
ATTORNEYS

May 24, 1966   M. SKOBEL   3,253,073
METHOD AND APPARATUS FOR MAKING A STRETCHABLE TAPE PRODUCT
Filed April 13, 1965   6 Sheets-Sheet 6

INVENTOR
MAX SKOBEL

BY Connolly and Hutz
ATTORNEYS

United States Patent Office

3,253,073
Patented May 24, 1966

3,253,073
METHOD AND APPARATUS FOR MAKING A
STRETCHABLE TAPE PRODUCT
Max Skobel, Adrian, Mich., assignor to Stauffer Chemical
Company, a corporation of Delaware
Filed Apr. 13, 1965, Ser. No. 449,386
17 Claims. (Cl. 264—174)

This is a continuation-in-part of Serial No. 174,092 filed February 19, 1962, now abandoned.

This invention relates to tape products having high resilient and elastomeric properties at elevated temperatures and more particularly to improvements in the process and apparatus for manufacturing insulating or electrical conducting tapes.

Insulating tapes, suitable for use in the manufacture of electrical machinery to withstand operating temperatures of 180° C. and higher, have heretofore been manufactured by preparing a glass fabric as an inner strengthening ply having an organopolysiloxane elastomer applied thereto by dipping or calendering. These known processes are slow because of unduly lengthy drying times required for the siloxane gel and its necessary solvent, and are complicated for additional reasons which add to their expense.

Where uniform taping of machinery elements around sharp corners or uneven surfaces is required, the glass fabric has been formed as a stretchable, bias woven sheet which is easily subject to unraveling and requires a binder for retaining the angularly directed threads in place during the silicone coating and curing operations. The binder is usually applied in a solvent and must be dried in a separate oven before application of the silicone. Subsequently the retaining means must be mechanically or chemically broken or dissolved adding to the expense of an already complex process.

In all known processes for making insulating tapes a very wide, coated sheet is first produced, for economy. The wide sheet is subsequently cut into narrow strips of usable width. The cutting leaves the inner fabric exposed at the side edges of the tape, an undesirable feature which permits moisture to enter along the fabric, arching over at the edges of the tape and promotes unraveling of the fabric strands within the tape.

It is a primary object of the present invention to obviate the above stated disadvantages of conventional processes and apparatus for making insulating tapes and to provide an improved method and apparatus which permits fabricating a tape product directly to the required width with the edges of the inner fabric sealed by insulating, impregnating and coating material.

Another object of the invention is to provide an improved process and apparatus for manufacturing insulating tape products which is capable of producing the tape at high speeds and more economically.

A further object of the invention is to provide an improved method and apparatus for making tape products which permits the application of coatings of different insulating materials to an inner ply, whereby one portion of one side of the finished tape may be tacky and the other portion nontacky and these portions being reversed on the opposite side of the tape, so that the tape when rolled will not stick adjacent layers together, but when taped on an electric machine, or part, with the adjacent layers offset will cause the sticking of the tape to the machine part.

A still further object of the invention is to provide an improved method for making tape products in which pressure is applied to the web being coated as it is moved past an extrusion orifice, the variation of said pressure and the extrusion speed permitting the variation of the thickness of the coating, and the width of the extrusion orifice ensuring the sealing of the edges of the web.

Still another object of the invention is to provide an improved method and apparatus for making tape products in which the fabric to be impregnated is formed simply by laying a parallel pattern of sinusoidally shaped fibers longitudinally and interlocking said fibers with breakable threads, impregnating and coating the fabric, curing the plastic coating material, and uniformly stretching the tape longitudinally to break the interlocking threads thereby permitting the finished tape to stretch longitudinally and transversely.

Yet another object of the invention is to provide an improved method and apparatus for forming stretchable tape products of the above described characteristics in which the inner ply of fabric is not woven before coating but is applied directly to a layer of the plastic, and covered with an undercoat plastic layer extruded thereon, thus avoiding the need for weaving the fabric before impregnation and coating.

Another object of the invention is to provide an improved process and apparatus for making tape products in which the fabric to be coated comprises sinusoidal longitudinal threads formed of electrical conductive material whereby to form a stretchable and insulated conductor or resistor element.

An important object of the invention is to provide improved apparatus for manufacturing lengths of a composite product taking the form of coated strand material comprising an endless surface mounted for continuous movement along an endless path, at least a portion of the path passing through a coating zone, means for insuring that the surface moves along a predetermined course at the portion of the path which passes through the coating zone, four stationary die surfaces mounted adjacent the moving endless surface in the coating zone, the first stationary die surface forming with the moving endless surface a seal which generally defines the beginning of the coating zone, the second stationary die surface forming with the moving endless surface an extrusion orifice for coating material, the third stationary die surface forming a feed guide for strand material, and the fourth stationary die surface forming another extrusion orifice for coating material which generally defines the end of the coating zone.

The novel features that are considered characteristic of the invention are set forth with particularly in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

Figure 1:
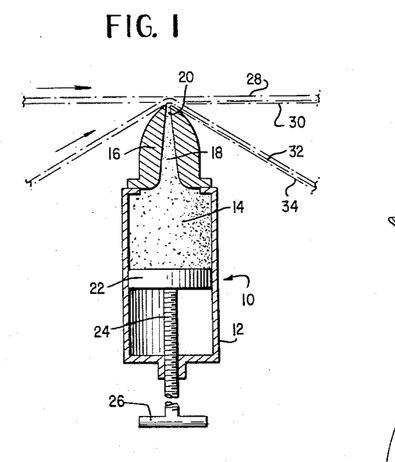
FIG. 1 is a longitudinal section of a hand extruder suitable for the extrusion of a plastic impregnant to coat a tape fabric and a nonadherent sheet, both shown in broken lines, illustrating separate steps of the improved process.
Figure 2:
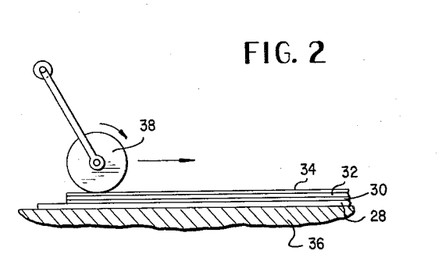
FIG. 2 is a diagram of a further step of the process in which the coating from the nonadherent surface is transferred to the tape fabric.

Referring now to the drawings, FIGS. 1 and 2 illustrate steps of a simple method capable of performance by hand according to the present improved process. In FIG. 1 is shown a hand extruder 10 comprising a container 12 enclosing an extrudable plastic 14. The plastic is subject to forceful ejection through a header die 16, which may be secured to the container by any suitable means, not shown. The die has a tapered passage 18 terminating in an orifice 20 whose width is selected to be just slightly wider than the finished tape product desired to fabricate. A piston 22 fixed to a screw shaft 24 having an exterior handle 26 is adapted to be turned within the container 10 for applying pressure to the plastic and ejecting the plastic through the orifice 20.

In the first step of the method the plastic is extruded from container 12 onto a moving sheet of metal 28, or other material to which the plastic will not permanently adhere. A thin coating of plastic 30 is deposited on the plate 28 as it moves past the orifice 20.

As a second step, a narrow band, or strip 32, formed of a fabric having fibers of glass, or other material suitable to form the inner, strengthening ply of the tape, is moved past the orifice with the strip tensioned over the rounded nose of the extrusion die 16. Simultaneously, the plastic 14 is forced out of the orifice against the underside of the woven strip with sufficient force to penetrate into the interstices between the fibers so that the plastic both coats and impregnates the fabric strip, the coating layer being indicated by the reference numeral 34.

As a third step, the plate 28 is laid with its coating 30 facing upwardly on a support 36 and the uncoated side of the fabric 32 is aligned with and laid upon the coating 30. A hand roller, or other suitable pressure means 38, is then passed over the coating 34 of the sandwiched fabric 32 one or more times. This pressure results in transferring the coating 30 from the metal plate 28 to the fabric strip 32 so that the latter is coated with layers 30 and 34 on opposite sides. Since the coating layers are slightly wider than the fabric 32, the edges of the fabric are covered and sealed by the plastic coating. If now the sandwiched fabric together with its coatings 30 and 34 are stripped from the plate 28, a tape is formed which may be subjected to conventional heating, or other curing steps, to set the plastic.

The finished tape is of the exact width desired for use and need not be cut longitudinally before use or before rolling into a tape spool suitable for sale. It should be understood that the fabric strip 32 may be made of nonstretchable material of any conventional type and the coatings be rubber, or other suitable insulating materials, as will be more fully described later. Alternatively, the fabric strip may be a stretchable material, such as glass fibers woven on a bias or may be sinuous fibers interlocked by breakable threads which can be severed after fabrication of the tape to render the tape stretchable both transversely and longitudinally. A means and method for breaking the interlocking threads will be described more fully hereinafter.

A more sophisticated apparatus for rapid and economic fabrication of tape products is diagrammatically illustrated in FIGS. 3–6. One or more extruders 40 are connected to a header 42 having a pair of spaced extrusion dies 44 and 46 which are removably and replaceably retained in position by mounting plates 48 and 50 secured by bolts 52. Each extrusion die is preferably formed in symmetrical halves which are held together by the plates 48 and 50 and the recesses in the header in which the dies are seated. Each die is formed with a tapered passage 18 and an orifice 20 similar to that described with respect to the hand extruder of FIG. 1. Adjacent the orifices 20, the exterior surfaces of the dies are rounded for a purpose to be explained. The passages 18 communicate with header passages 54 and 56 which in turn communicate at one end with the passages 58 at right angles thereto. The other ends of passages 58 communicate with the interior of the extruders 40. The latter are adapted to be operated at great pressure by conventional hydraulic or mechanical means.

Figures 3, 7, 8:
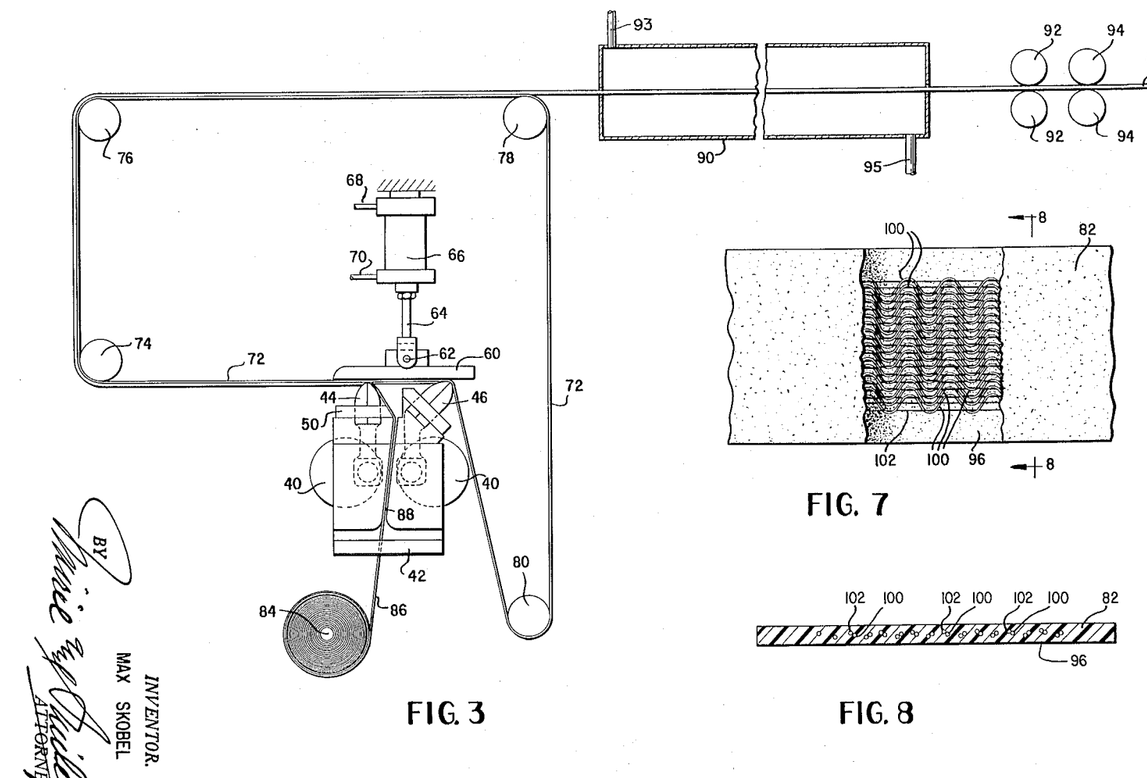
FIG. 3 is a diagram of a preferred apparatus, partially in elevation and partially in longitudinal section, for performing the improved process.
FIG. 7 is a plan view of tape produced by the apparatus, a portion of the coating being broken away to reveal the inner ply.
FIG. 8 is an enlarged section taken along line 8—8 of FIG. 7.

The orifices 20 are preferably located substantially in the same plane and are opposed by a freely movable pressure plate 60 pivotally connected at 62, a point somewhere near its center, to the rod 64 of a pneumatic or hydraulic pressure cylinder 66 having fluid inlet 68 and outlet 70.

An endless belt 72 is trained over the rollers 74, 76, 78 and 80 to pass between the extrusion orifices 20 and the pressure plate 60 at high speed. For this purpose, one or more of the rollers, as for example 74 or 76, may be driven, or other conventional means may be used to impart drive to the belt 72. The belt is preferably formed of Mylar, Teflon or other materials which are flexible but only slightly adherent to the plastic insulating material to be extruded. It has been found that the belt may be driven at any speed varying from a very slow speed to one as high as 1000 feet per minute.

A supply roll 84, FIG. 3, is provided on which is wound a fabric strip 86. The fabric passes from roll 84 through a passage 88 in the header 42 and over the rounded nose of the extrusion die 44, which tensions the fabric, and is then trained over rolls 74, 76 and 78. From roll 78 the fabric 86, coated on both sides and driven by any suitable means at the same speed as belt 72, passes through a heating apparatus 90 having an inlet for heating fluid 93 and an outlet 95. From the oven 90 the tape passes between two pairs of drive rolls 92 and 94, the latter of which is driven at a slightly faster speed than the former, for a reason to be later explained. Leaving the rolls 94, the tape 86 is wound directly upon one or more spools, not shown, to any desired length.

Figure 4:
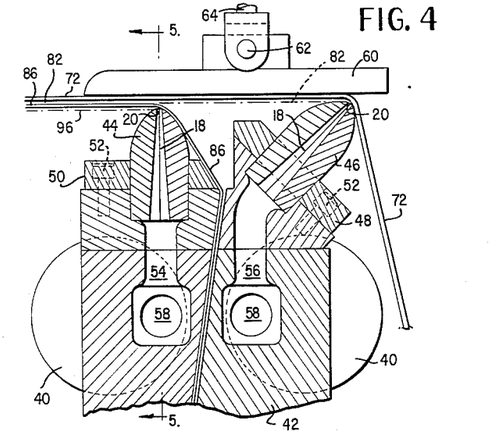
FIG. 4 is a fragmentary sectional view of the extruder header shown in FIG. 3 and illustrating the application of the impregnant to a pair of moving webs pressed against the extrusion orifice by a pressure member shown in elevation.
Figure 5:
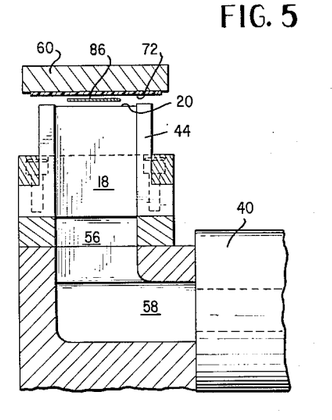
FIG. 5 is a fragmentary sectional view taken along lines 5—5 of FIG. 4 in the direction of the arrows.
Figure 6:
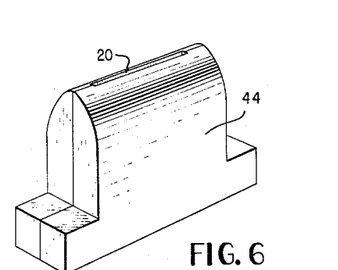
FIG. 6 is an enlarged perspective view of an extrusion die utilized in the apparatus of FIGS. 3–5.

It will be apparent from FIGS. 3 and 4 that silicone compound or other impregnants are extruded through the dies 44 and 46 against the undersides of the belt 72 and the fabric strip 86, the latter being slightly less in width than the finished tape and the extrusion orifices 20 being of exactly the width of the desired tape product. The belt and the fabric are tensioned and stretched by the curved noses of the extrusion dies 44 and 46. The belt, being of a nonporous, nonadhesive material, receives a coating 82 of the silicone material extruded on its underside. The die insert 44, in extruding the silicone, impregnates the pores or spaces between the fibers of the fabric strip 86 as well as forms the thin coating 96 below and covering the fabric. As the belt 72 passes between the extrusion head 44 and the pressure plate 60, the silicone impregnant passing through the pores of the fabric meets the coating 82 on the underside of the belt and adheres thereto, so that a transfer of coating 82 is effected to the upper side of the fabric strip 86. The belt and fabric strip are driven to pass the extrusion orifices at the same speed. The pressure, exerted by plate 60 under the influence of the pressure chamber 66, is preferably adjustable between the limits of about 10–15#/sq. in. This pressure together with the extrusion rate, i.e. the rate of movement of the fabric 86, will determine the thickness of the coatings 82 and 96 which may vary as described.

The fabric strip forming the backing layer or reinforcement of the tape may be woven of glass or Dacron fibers or may be formed of any woven fabric material. A preferred fabric strip is formed by glass fibers 100 laid longtiudinaly and parallel to form a sinuous, or serpentine, pattern which will ultimately permit stretching of the fabric both longitudinally and transversely of the finished tape. The fibers 100 are locked by longitudinal fibers 102 which pass over and under the loops of the fibers 100. If desired, each fiber 102 may be looped or knotted about the intersecting loops of fibers 100. The glass fibers 100 are preferably about 1.5–2.0 mils in diameter. Alternatively, the threads 100 may be thin wires of copper, nichrome or suitable electrical conducting metals or alloys. The breakable, locking threads 102 are preferably formed of nylon, polyethylene, a thermoplastic or even cotton and are of smaller diameter being about 0.1–0.2 mil in diameter.

The extruders 40 are adapted to eject a putty-like insulating material, such as silicone compound, by cold extrusion and at normal room ambient temperature through the orifices 20 onto the belt 72 and fabric strip 86. A preferred silicone elastomer material is marketed by Dow Corning as a commercial product labeled DC 50. Other suitable silicone elastomers are set forth in considerable detail in U.S. Patent No. 2,816,348, issued December 17, 1957, to W. J. Adamik. It should be understood however that the solvents specified for dipping in the patent are unnecessary in the present process. The extrusion may be at pressures up to 8000# per square inch or may be so low as merely sufficient to push the silicone compound out of the orifices 20 and into the pores of the fabric strip. As indicated above, a large range of plastic or other insulating materials may be extruded. For example, a rubber compound may be used. In such instance the compound must be heated to slightly above 180° F. to make it sufficiently plastic for extrusion purposes.

Other silicone compounds may also be used including ones which cure to evidence a tacky or adhesive property. One such silicone compound is DC 6538 also marketed by Dow Corning. Another suitable insulating impregnant for extrusion is the commercially available type W neoprene marketed by the Du Pont Corporation.

The belt 72 separates from the coated fabric strip 86 as it passes over roll 78. The fabric strip, coated on both sides, is passed through the oven 90 which preferably contains air at 500–1000° F., the duration of passage being about 30 seconds. This is sufficient to set the putty-like silicone compound or organopolysiloxane gel to an elastomer solid. If rubber or neoprene is used as the insulating impregnant, curing for about 1½ minutes in steam at pressure of about 250#/sq. in. is necessary. Preferably the oven is about 30 feet in length and to enable the coated fabric 86 to cure for the required time it may be passed back and forth over rollers, not shown, or the speed of movement may be reduced within the oven by use of suitable storing means, also not shown, at the entrance of the oven. Thereafter, upon passing the two sets of rolls 92 and 94, the latter of which is driven slightly faster than the former, the completed tape is stretched between said rolls sufficiently to break the thin locking fibers 102 at each loop of the serpentine glass fibers. Internally, the finished tape will have the appearance shown in FIGS. 7 and 8 except that the threads 102 are broken permitting the tap to be stretched both laterally and longitudinally.

It is apparent from examination of FIG. 8 that the coatings 82, 96 enter the spaces between the fibers 100 and extend past the lateral edges of the fabric strip so as to completely seal the edges of the tape. Thus, the described apparatus is suitable for forming, at high speeds, a tape to an exactly desired width, ready for usage without further longitudinal cutting as is common in conventional manufacturing processes.

Figures 9, 9A:
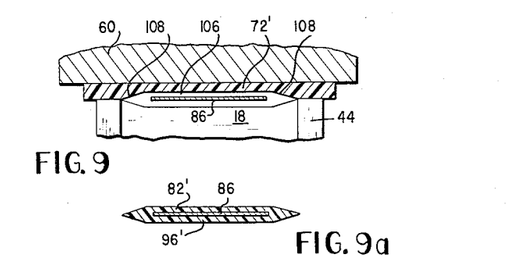
FIG. 9 is an enlarged, fragmentary, sectional view similar to FIG. 5 and showing a modified embodiment of the apparatus.
FIG. 9a is a transverse section through tape formed by the apparatus of FIG. 9.

In FIG. 9 is shown a modification of the apparatus in which the endless belt 72' is formed with a longitudinal channel 106 having outwardly and downwardly inclined side edges 108. As a result of this configuration the finished extruded tape is shaped substantially as shown in FIG. 9a with the thin impregnating coatings 82' and 96' having beveled lateral edges on fabric 86. Other shapes and configurations of the sealing portions of the insulating coatings are obviously possible.

Figure 10:
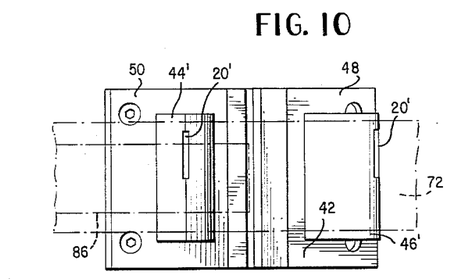
FIG. 10 is a plan view of an extrusion header having modified dies.
Figure 11:
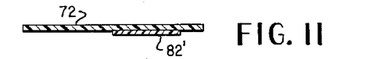
FIGS. 11–11d are sectional views illustrating the results of successive steps in the formation of a tape with the apparatus of FIG. 10.
Figure 11A:
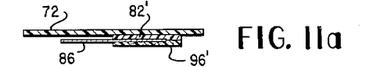
Figure 11B:
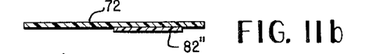
Figure 11C:
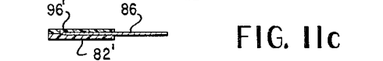
Figures 11D, 11E:
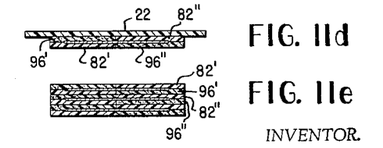
FIG. 11e is a fragmentary section through a completed roll of tape formed on the apparatus of FIG. 10.
Figure 11F:
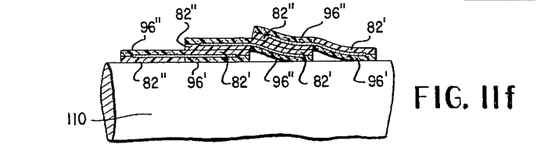
FIG. 11f is a fragmentary sectional view showing the tape of FIG. 11e applied to the taping of electrical machinery.

FIGS. 10 and 11 illustrate a modification of the apparatus for extruding different coating materials as, for example, tacky and nontacky when cured, in such a manner that the finished tape may be wound on a roll without a spacer between the turns of the tape to prevent the tape layers from sticking together. The modified apparatus comprises identical apparatus to that of FIG. 3 except that the die inserts are changed to provide shorter extrusion orifices 20' in new dies 44' and 46'. The orifices 20' are preferably slightly longer than half the width of the finished tape as clearly illustrated in FIG. 10. The apparatus may be operated then to provide a layer 82', FIG. 11, of tacky silicone compound when cured on the underside of the belt 72 and a similar layer 96' of nontacky silicone on the underside of the fabric strip 86. Both layers when combined under the pressure plate over the extrusion insert 44' having the appearance illustrated in FIG. 11a and covering roughly half the width of the fabric strip. When a sufficient length of fabric strip has been thus half coated with tacky material on one side and nontacky material on the other, the fabric strip is removed from the apparatus, reversed and reiserted to pass through the extrusion header 42 once again. During this pass a tacky coating 82" is formed on the underside of belt 72, see FIG. 11b, and a nontacky coating 96" on the underside of the fabric strip, the latter two coatings being applied to the fabric strip at the uncoated side portions in the first pass. As a result (see FIG. 11d) the upper side of the fabric strip will have a nontacky coating 96' and a tacky coating 82" while the underside of the fabric strip will be coated with a tacky portion 82' under the nontacky portion and a nontacky portion 96" under the tacky portion. Therefore, when the finished and cured tape is rolled the adjacent layers of the tape will be positioned so that the tacky portions 82' and 82" are always spaced from each other by intervening layers of the non-tacky portions 96′ and 96″ (see FIG. 11e). In this manner the tape may be rolled without a separator; will not permanently stick adjacent layers together but may be easily unrolled to apply to an electric machine element, or cable, as shown in FIG. 11f. When the cable 110 is taped with the adjacent layers offset laterally about one half tape width, the tacky portions 82′ and 82″ register to strongly adhere the tape layers together.

Figure 12:
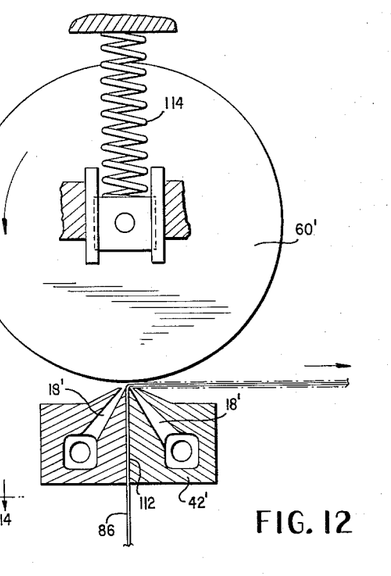
FIG. 12 is a diagrammatic sectional view, partly in elevation, of a modified extrusion head and pressure member.

In FIG. 12 is shown a modified apparatus in which the endless belt is eliminated. The apparatus may otherwise be substantially identical to that shown in FIG. 3 with the following exceptions. The extrusion header 42′ is provided with a pair of tapered passages 18′ which are angled toward each other and terminate in extrusion openings substantially in the same plane. A central passage 112 permits the pulling of the fabric strip 86 through the extrusion header and over one extrusion orifice tensioned by the curvature of the edge of the header bordering the orifice. Instead of a pressure plate 60 there is provided a large diameter pressure roller 60′, spring urged toward the extrusion orifices by the resilient means 114. The roller is driven in the direction shown by the arrow and the insulating material extruded out of the second orifice is ejected toward the roller 60′ and toward the upper side of the fabric strip as it turns over the first orifice. The roller 60′ is desirably provided with a polished chromium surface so that there will be no tendency of the plastic coating to adhere to its surface. In effect, the pair of extrusion orifices simultaneously coat and impregnate the fabric strip from both sides. The remainder of the apparatus previously described may be utilized to cure the impregnant and to stretch and break the locking threads of the fabric strip.

Figure 13:
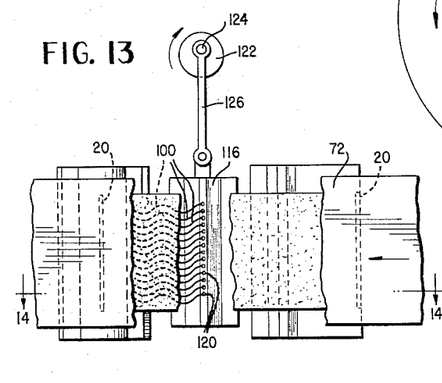
FIG. 13 is a fragmentary plan view of still another embodiment of the apparatus with parts broken away.
Figure 14:
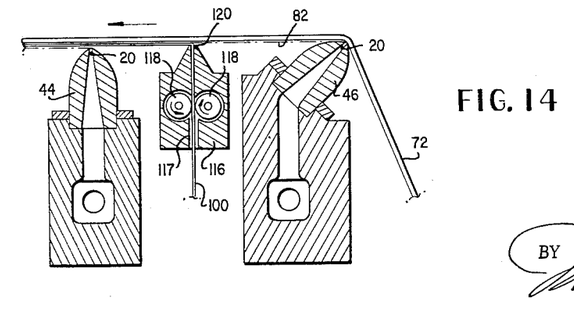
FIG. 14 is a longitudinal sectional view taken along line 14—14 of FIG. 13.

FIGS. 13 and 14 illustrate still another modified apparatus in which the fabric strip is formed during the extrusion process and need not be woven or prefabricated beforehand. The modified apparatus is in all respects similar to the apparatus illustrated in FIG. 3 except that the extruder die inserts 44 and 46 are separated to provide space between them for a fiber feeding head 116. A central passage 117 in head 116 guides individual glass fibers 100 upwardly through spaced openings 120 in the top of the head against the coating 82 on the under surface of the belt 72. The fibers 100 are fed upwardly by a pair of drive rolls 118 which may be driven by any suitable means. While the fibers are being fed upwardly, the head 116 is reciprocated transversely of the moving belt by means of a driven roller 122 having a crank pin 124 connected to the feed head 116 by pivoted link 126. Conventional guides for restricting motion of the feed head 116 to a reciprocating path transverse to the belt are utilized but not shown. Because of the reciprocation imparted to the fibers 100 as they strike the coating 82, the fibers adhere to the coating in a serpentine pattern as shown in broken lines in FIG. 13. This avoids the need for longitudinal locking threads to be later broken. When the second extrusion orifice in die 44 ejects the silicone compound on the underside of the adhered threads, a complete tape is formed which may be stripped from the endless belt 72 and passed through an oven for setting the silicone. The tape product is then complete and ready for use without the need to stretch the tape longitudinally to break locking fibers.

Figure 15:
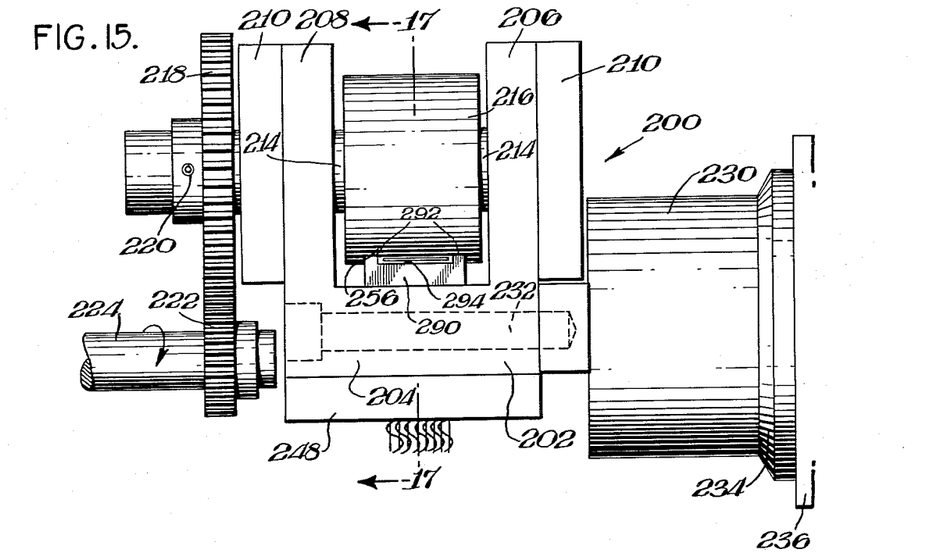
FIG. 15 is a front elevational view of a modified and improved extrusion apparatus.
Figure 16:
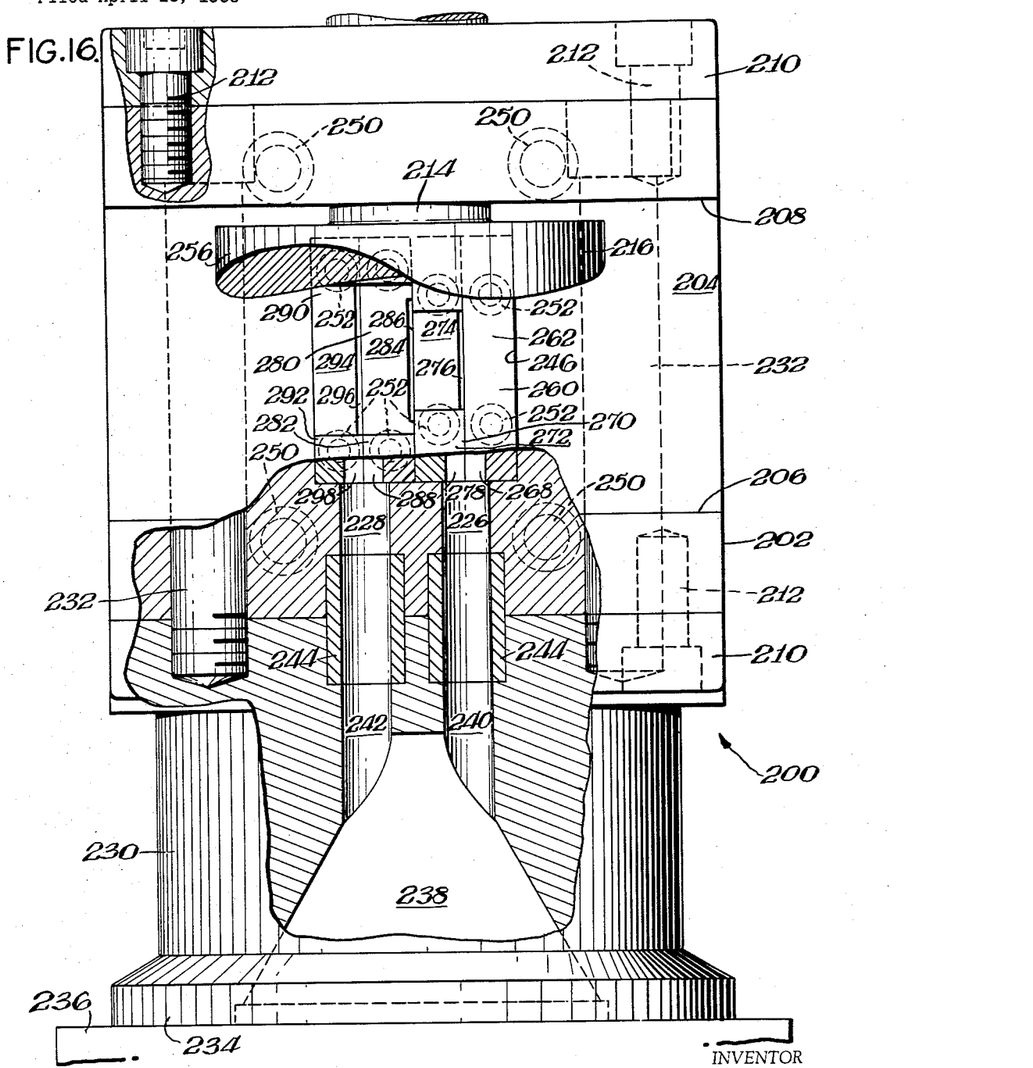
FIG. 16 is a plan view of the extrusion apparatus of FIG. 15 with parts broken away to expose details.
Figure 17:
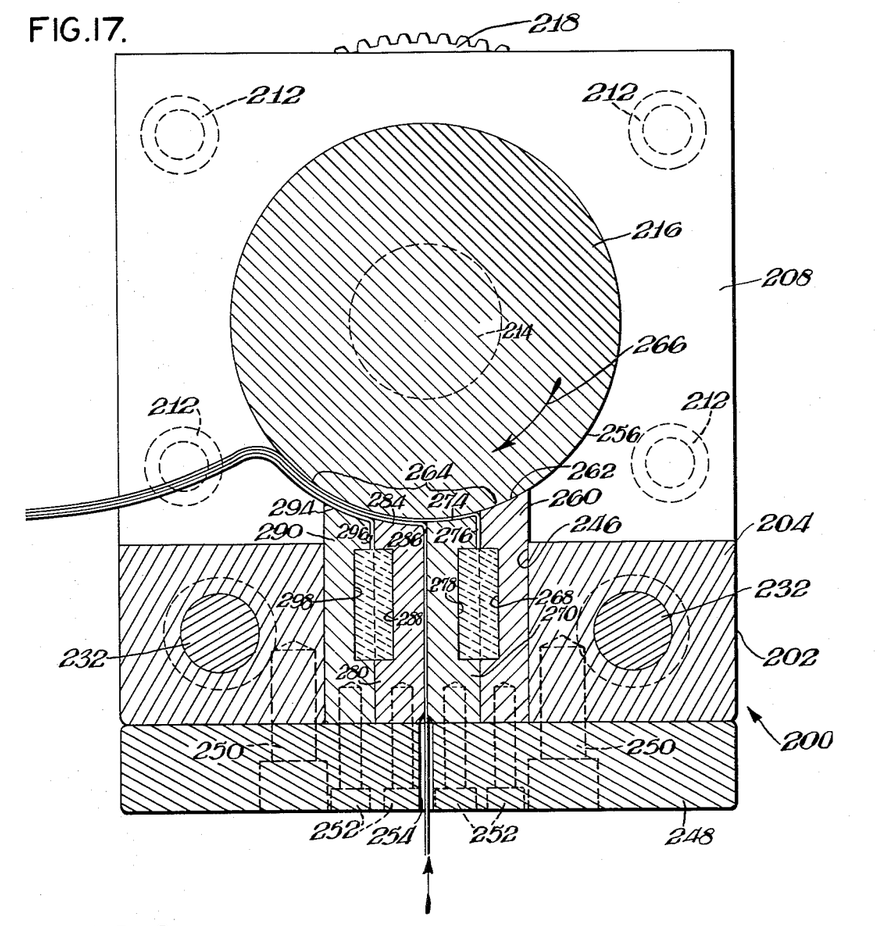
FIG. 17 is a sectional elevational view on line 17—17 of FIG. 15.

In FIGS. 15–19, an improved extrusion apparatus is illustrated as one example of a commercially successful arrangement for producing the endless lengths of composite tape products according to this invention. As best seen in FIGS. 15, 16 and 17, the apparatus 200 comprises a U-shaped frame 202 having a horizontal base portion 204 with upstanding wing or side portions 206 and 208. Each generally rectangular side portion 206, 208 has a bearing block arrangement 210 secured as at 212 to the outer face thereof. The side portions 206, 208 each include suitable apertures, not specifically shown, to permit reception of the hub or axle portions 214 of a unitary disc-shaped rotating member 216. The hubs 214 are journaled in the bearing blocks 210 to permit rotation of the disc-shaped member 216 within the upstanding side walls 206, 208 of the frame 202.

One of the hubs 214 of the disc-shaped member 216 extends beyond its bearing block 210 and includes a drive gear 218 secured as at 220 thereon. A drive pinion 222 powered by a rotary shaft 224 meshes with the gear 218 and serves to impart the desired rotary motion to the disc-shaped member 216.

On the opposite side of the base portion 204 of the frame 202, a pair of coating material feed channels 226 and 228 are provided for a purpose described below. A coating material in-feed head 230 is secured as at 232 to the base portion 204 of the frame 202. The in-feed head 230 includes an input end 234 which may be suitably secured to a coating material feed mechanism 236, such as a screw powered pressurizing chamber. A conical opening 238 leads from the input end 234 of the head 230 in an inwardly tapered fashion to define a common source of pressurized coating material. A pair of feed channels 240 and 242 lead from the common source chamber 238 to the feed channels 226 and 228, respectively, formed in the base portion of the frame 202. A pair of tubular seal elements 244 may be provided in suitable counterbores if desired to minimize leakage of pressurized coating material where the channels 240 and 242 of the head 230 join the channels 226 and 228, respectively, of the frame 202.

The base portion 204 of the U-shaped frame also includes a rectangular thru-opening 246 designed to receive die insert elements in a manner described below. As can be seen, in the illustrated embodiment, the opening 246 is centered beneath the axis of rotation of the disc-shaped member 216. The inner ends of the coating material feed chambers 226 and 228 communicate with one side of the rectangular opening 246 at spaced locations mid-way of the depth of the opening 246.

The above mentioned die insert elements are supported within the opening 246 by means of an underlying support plate 248 which may be releasably secured as at 250 to the lower surface of the frame 202. The die insert elements conveniently are secured as at 252 to the top of the underlying support member 248 in proper positional relationship to be received in the opening 246 in the base portion 204 of the frame 202. A strand material feed channel 254 is also provided centrally of the underlying support member 248 to admit a supply of tape-like strand material from a distant source, such as the source 84 in FIG. 3.

The disc-shaped member 216 provides an endless surface 256 mounted for continuous movement along an endless path. Advisably, the surface 256 is cylindrical and of non-porous material such as steel so that the coating material extruded against the surface 256 will not adhere thereto any more than is desired. The endless surface 256 obviously moves continuously along a circular path, the lower portion of the path directly above the opening 246 in the base of the frame constituting a coating zone. Additionally, because of the bearing block members 210 secured to the frame, the endless surface 256 moves along a strictly predetermined course through the coating zone. While other embodiments such as the endless belt arrangements described above may readily be employed, it has been found desirable to provide the endless surface 256 on a member such as 216 mounted for rotation about a constant axis. Finally, it will be noted that the axial dimension of the endless surface is sufficient, such as a width of several inches, to accommodate a wide range of widths for finished lengths of coated strand material; and, the circumferential length of the endless surface is such that the curvature of the disc-shaped member 216 may conveniently be accommodated with easily machineable die insert elements as explained below.

Figure 18:
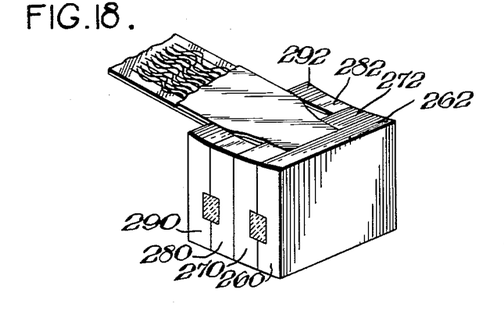
FIG. 18 is a fragmentary perspective view of the die insert elements useable with the extruder apparatus of FIG. 15.
Figure 19:
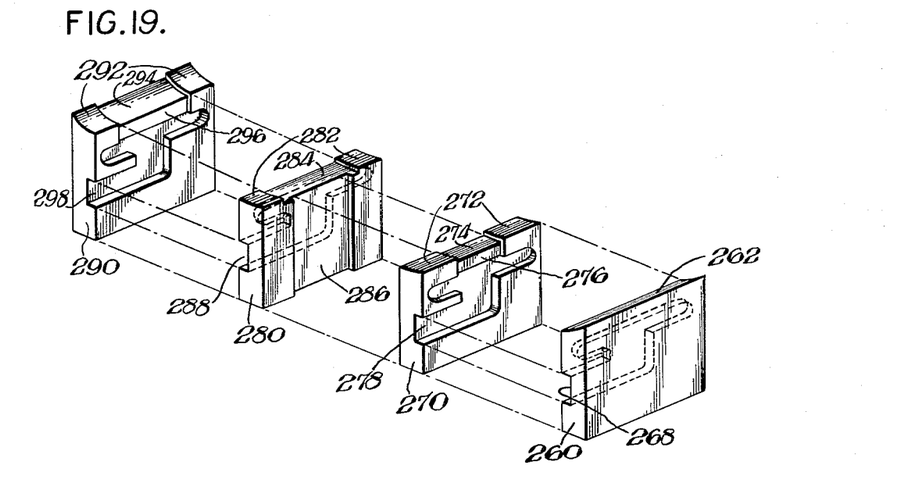
FIG. 19 is an exploded view of the die insert elements of FIG. 18.

In the opening 246 in the frame 202 are a plurality of insert elements each providing a particular die surface which cooperates with the moving endless surface 256. For example, in the illustrated embodiment four such insert elements are shown. The first insert element 260 secured as at 252 to the underlying support member 248 includes an axially elongated arcuate die surface 262 machined on the upper edge thereof. The height of the insert element 260 and the curvature of the stationary die surface 262 are such that the surface 262 rides with a working fit closely adjacent the moving endless surface 256. The proximity of these two surfaces is such that a seal is formed which generally defines the beginning of the coating zone 264. The seal is effective to prevent extruding coating material from being squeezed between the stationary surface 262 and the endless surface 256 when the disc-shaped member 216 is rotating in the direction of the arrow 266. Additionally, the insert element 260 includes a lateral or axial feed channel 268 for coating material which communicates with the feed channel 226 of the frame when the insert element is properly positioned in the aperture 246.

The second insert element 270 is also secured as at 252 to the underlying support member 248 in proper positional relationship in the opening 246. The second insert element 270 is positioned adjacent the first insert element 260, and includes an axially elongated arcuate surface 272 along its upper edge. The surface 272 again corresponds with the path of rotation of the moving endless surface 256. A second stationary die surface 274 is machined at the mid-portion of the arcuate surface 272 so as to be positioned a small predetermined radial distance from the path of the moving endless surface. The second die surface 274 thus forms with the moving endless surface 256 an extrusion orifice for coating material. An upwardly directed coating material feed channel 276 formed on the second insert element 270 communicates at its upper end with the leading edge of the stationary die surface 274. The lower end of the vertical feed channel 276 communicates with a lateral or axial directed feed channel 278 for coating material, which in effect forms the mating other half of the channel 268 provided in the first insert element 260. The entrance end of the channel 278 also communicates with the feed channel 226 in the wall of the opening 246 when the second insert element 270 is properly positioned therein. The effective width of the vertical channel 276 is such that the effective cross-sectional feed area for extruding coating material is somewhat greater than the effective cross-sectional feed area formed between the stationary die surface 274 and the moving endless surface 256.

A third insert element 280 is also secured as at 252 to the underlying support member 248 in proper positional relationship within the opening 246. The insert element 280 is positioned adjacent the insert element 270. An axially elongated arcuate surface 282 is machined along the upper edge of the insert element 280 to ride closely adjacent the surface 256 of the disc-shaped member 216. A stationary die surface 284 is machined medially of the surface 282 so as to be located a predetermined radial distance from the path of the endless surface 256 in the coating zone. The predetermined distance is somewhat greater than the distance of the die surface 274 from the endless surface 256, by an amount which varies slightly depending upon the thickness and nature of the strand material which is to be coated. The third stationary die surface 284 forms a feed guide for strand material and, in the illustrated embodiment, constitutes an arcuate passage corresponding with the arc of the disc-shaped member 216. An upwardly directed strand material feed channel 286 communicates at its upper end with the feed guide surface 284 and at its lower end with the feed slot 254 formed in the underlying support member 248 centrally of the aperture 246. This passage permits upward movement of strand material to be coated, and is preferably of a slightly greater dimension, measured axially of the apparatus, than the width of the second stationary die surface 274 and slightly less than the width of the feed guide die surface 284. The insert element 280 also includes a lateral or axially directed feed channel 288 similar to the channel 268 of the insert element 260.

The final insert element 290 is secured as at 252 to the underlying support element 248 in proper positional relationship within the opening 246 of the frame. The insert element 290 includes an axially elongated arcuate surface 292 machined along its upper edge. As with the other insert elements, the surface 292 is adapted to ride against the periphery of the disc-shaped member 216. A fourth stationary die surface 296 is machined medially of the surface 292 so as to be positioned a radial distance from the moving endless surface which is slightly greater than the distance of the feed guide die surface 284 from the endless surface. Again, the increase in the radial depth of the surface 294 is dependent upon the nature of the material being coated, the nature of the coating material being extruded, and the characteristics desired in the finished elongated composite product. An upwardly directed coating material feed channel 296 communicates at its upper end with the leading edge of the die surface 294, and at its lower end with a lateral or axially directed feed channel 298 similar to the feed channel 278 of insert element 270. Again, the cross-sectional feed area of the upwardly directed channel 296 is greater than the cross-sectional feed area of the die surface 294 whereby the die surface 294 forms with the moving endless surface another extrusion orifice for coating material. This final extrusion orifice generally defines the end of the coating zone 264.

In operation, with the apparatus assembled as illustrated in FIGS. 15–19, the drive shaft 224 is connected to a power source of rotary motion to impart steady, continuous motion in the direction of the arrow 266 to the endless surface 256 formed on the periphery of the disc-shaped member 216. Strand material of the type which is to be coated is threaded upwardly through the slot 254 in the underlying support member 248, and then upwardly through the channel 286 formed in the insert element 280 and then circumferentially through the remainder of the coating zone 264. Coating material pressurized in the member 236 is supplied from the common source 238 in the head 230 through the channel 240, 226, 268 and 278, and 276 to the first extrusion orifice formed by the stationary second die surface 274. Coating material is also supplied from the source 238 through the channel 242, 228, 288 and 298, and 296 to the second extrusion orifice formed by the stationary fourth die surface 294. At the beginning of the coating zone 264, coating material extruded upwardly through the passage 276 is prevented from moving counterclockwise by the seal formed between the first stationary die surface 262 and the moving endless surface 256. Accordingly, the extruded coating material is carried by the moving endless surface, in a quantity and with a cross-sectional configuration determined by the extrusion orifice at 274, through the coating zone. Strand material fed upwardly through the feed channel 286 thereafter comes laterally or radially into contact with the first layer of coating material on the moving endless surface. Thereafter, the strand material moves circumferentially through the coating zone slightly pressed by the feed guide surface 284 into contact with the layer of coating material which is already on the moving endless surface. Next, coating material extruded upwardly through the passage 296 moves into the openings or interstices in the strand material and completely coats the strand material. The outer cross-sectional configuration of the final coated product is defined by the second extrusion orifice formed by the fourth stationary die surface 294 and the moving endless surface 256. The strand material is embedded centrally of the final coated product, and its width is such that its edges are completely encased in coating material. Thereafter, as the elongated composite coated product leaves the coating zone 264 it is peeled or separated carefully from the surface 256. The elongated length is then directed through a suitable curing stage, such as a heating chamber, to suitably cure the coating material. If for instance, the coating material is a silicon product as described above, and the strand material is fiberglass with lateral contortions therein, the final cured product comprises an elongated, stretchable tape after the weak threads which maintain the lateral contours in the strand material during coating are finally broken.

The improved extrusion apparatus described in connection with FIGS. 15–19 thus constitutes an improved apparatus wherein the die surfaces on the various insert elements 260, 270, 280 and 290 may readily be replaced with other somewhat different surfaces to co-act with the moving endless surface 256. Depending upon the shape and size of the various surfaces employed, a wide range of finished tape products may thus be produced on the apparatus of FIGS. 15–19.

It should be apparent from the above description that the present invention provides simple, efficient and economical processes and apparatus for fabricating tape products directly to the narrow width desired for usage without the necessity for longitudinal slitting.

It should be further apparent that stretchable tape products are efficiently produced by the above described process, and that the stretch tape fabricated need not be solely an insulating type but may comprise a reinforcing fabric of electrical conductors which will yield a flexible, stretchable, thin strip multiple path conductor insulated by silicone, neoprene or rubber. Such a product is suitable for connecting elements of electric and electronic circuits, or for providing stretchable, electric resistor elements for heating to be wound around tubular type ovens, or the like.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. A method of manufacturing lengths of a composite product taking the form of completely coated strand material which comprises providing an endless surface contoured to define a portion of the transverse cross-sectional configuration of the product, moving the surface along an endless path, positioning an extrusion orifice adjacent the path of the moving surface, transferring coating material in the plastic state from the extrusion orifice to deposit a layer of coating material on the moving surface which layer is pressure formed to a predetermined width, thickness and configuration by controlling the distance between the extrusion orifice and the moving surface, moving strand material which is narrower than the width of the layer along another path having a portion adjacent the path of the moving surface, controlling the distance of the strand material from the moving surface so as to bring one side of the strand material laterally into pressure engagement with the layer of coating material on the moving surface, and flowing coating material in the plastic state from additional applicator means to another side of the strand material under pressure and in a manner to deposit the coating material on the strand material in a layer of predetermined thickness and configuration and of a width greater than the strand material to provide a composite product including coating material of pre-defined cross-sectional configuration with strand material completely embedded therein.

2. A method of manufacturing lengths of a composite product as in claim 1 wherein the moving surface and the moving strand material are moved in essentially the same direction along their respective paths and at approximately equal speeds when the strand material is pressure engaged with the layer of coating material on the surface.

3. A method of manufacturing lengths of a composite product taking the form of coated strand material which comprises providing an endless surface contoured to define a portion of the transverse cross-sectional configuration of the product, moving the surface along an endless path, positioning a first extrusion orifice adjacent the path of the moving surface, transferring coating material in the plastic state from the first extrusion orifice to deposit a layer of coating material on the moving surface which layer is pressure formed to a predetermined configuration by controlling the distance between the first extrusion orifice and the moving surface, moving strand material to be coated along another path having a portion adjacent the path of the moving surface, controlling the distance of the strand material from the moving surface so as to bring the strand material into pressure engagement with the layer of coating material on the moving surface, providing a second extrusion orifice contoured to define another portion of the transverse cross-sectional configuration of the product, positioning the second extrusion orifice adjacent the path of the strand material, transferring coating material in the plastic state from the second extrusion orifice while controlling the distance between the second extrusion orifice and the strand material to flow a layer of coating material of predetermined configuration on the strand material under pressure to provide a composite product including coating material of pre-defined cross-sectional configuration with strand material completely embedded therein.

4. A method of manufacturing lengths of a composite product as in claim 3 wherein the motion of the moving surface and the strand material is essentially continuous and at a generally uniform velocity.

5. A method of manufacturing lengths of a composite product taking the form of coated strand material which comprises providing an endless surface contoured to define a portion of the transverse cross-sectional configuration of the product, moving the surface in generally continuous fashion along an endless path having a portion passing through a coating zone, positioning a first extrusion orifice adjacent the path of the moving surface at the beginning of the coating zone, transferring coating material in the plastic state from the first extrusion orifice to deposit a generally continuous layer of coating material on the moving surface which layer is pressure formed to a predetermined configuration by controlling the distance between the first extrusion orifice and the moving surface, the layer to be carried by the moving surface through the coating zone, moving strand material to be coated in generally continuous fashion along another path having a portion entering the coating zone at a point beyond the first extrusion orifice to pass through the remainder of the zone adjacent the path of the moving surface, controlling the distance of the strand material from the moving surface in the remainder of the coating zone so as to bring the strand material into pressure engagement with the layer of coating material on the moving surface, providing a second extrusion orifice contoured to define another portion of the transverse cross-sectional configuration of the product, positioning the second extrusion orifice adjacent the path of the strand material in the coating zone at a point beyond the entry point of the strand material, transferring coating material in the plastic state from the second extrusion orifice while controlling the distance between the second extrusion orifice and the moving surface to flow a generally continuous layer of coating material of predetermined configuration on the strand material under pressure, and separating the coated strand material from the moving surface at the end of the coating zone to provide a composite product including coating material of predetermined cross-sectional configuration with strand-material embedded therein.

6. A method of manufacturing lengths of a composite elongatable product taking the form of coated strand material which comprises providing an endless surface contoured to define a portion of the transverse cross-sectional configuration of the product, moving the surface along an endless path, positioning a first extrusion orifice adjacent the path of the moving surface, transferring yieldable coating material in the plastic state from the first extrusion orifice to deposit a layer of yieldable coating material on the moving surface which layer is pressure formed to a predetermined configuration by controlling the distance between the extrusion orifice and the moving surface, providing lengths of strand material to be coated which comprises at least one generally continuous filament of essentially inelastic material longitudinally shortened by plural lateral contortions and including means effective to maintain the strand material in such longitudinally shortened condition, moving the strand material along another path having a portion adjacent the path of the moving surface, controlling the distance of the strand material from the moving surface so as to bring the strand material into pressure engagement with the layer of yieldable coating material on the moving surface, providing a second extrusion orifice contoured to define another portion of the transverse cross-sectional configuration of the product, positioning the second extrusion orifice adjacent the path of the strand material, transferring yieldable coating material in the plastic state from the second extrusion orifice while controlling the distance between the second extrusion orifice and the strand material to flow a layer of yieldable coating material of predetermined configuration on the strand material under pressure, and removing the effect of the means which maintained the strand material in the longitudinally shortened condition to provide a composite product including yieldable coating material of predefined cross-sectional configuration with elongatable strand material embedded therein.

7. A method of manufacturing lengths of a composite elongatable product taking the form of completely coated strand material which comprises providing an endless surface contoured to define a portion of the transverse cross-sectional configuration of the product, moving the surface in generally continuous fashion along an endless path having a portion passing through a coating zone, positioning a first extrusion orifice adjacent the path of the moving surface at the beginning of the coating zone, transferring yieldable coating material in the plastic state from the first extrusion orifice while controlling the distance between the first extrusion orifice and the moving surface to pressure form a generally continuous layer of yieldable coating material to a predetermined width, thickness and configuration on the moving surface to be carried thereby through the coating zone, providing lengths of strand material to be coated which comprises at least one generally continuous filament of essentially inelastic material longitudinally shortened by plural lateral contortions including means effective to maintain the strand material in such longitudinally shortened condition, moving the strand material in generally continuous fashion along another path having a portion entering the coating zone at a point beyond the first extrusion orifice to pass through the remainder of the zone adjacent the path of the moving surface, controlling the distance of the strand material from the moving surface in the remainder of the coating zone so as to bring the strand material into pressure engagement with the layer of yieldable coating material on the moving surface, providing a second extrusion orifice contoured to define another portion of the transverse cross-sectional configuration of the product, positioning the second extrusion orifice adjacent the path of the strand material in the coating zone at a point beyond the entry point of the strand material, transferring yieldable coating material in the plastic state from the second extrusion orifice while controlling the distance between the second extrusion orifice and the moving surface to flow a generally continuous layer of coating material of predetermined configuration having a width greater than the strand material under pressure on the strand material, and removing the effect of the means which maintained the strand material in the longitudinally shortened condition to provide a composite product including yieldable coating material with elongatable strand material completely embedded therein.

8. A method of manufacturing lengths of a composite elongatable product as in claim 7 wherein the yieldable coating material comprises a silicon rubber product and wherein the coated product is subjected to a curing operation to impart resilient characteristics to the silicon rubber coating material.

9. Apparatus for manufacturing lengths of a composite product taking the form of coated strand material comprising first coating material applicator means including an endless surface contoured to define a portion of the transverse cross-sectional configuration of the composite product, drive means connected to move the surface along an endless path having one portion which passes through a coating zone, means connected to apply a uniform layer of coating material in the plastic state to the moving applicator surface at the beginning of the coating zone, means connected to move strand material to be coated along a path which directs strand material in the coating zone adjacent the moving applicator surface and closer thereto than the thickness of the layer of coating material thereon, and second coating material applicator means in the coating zone including orifice means contoured to define another portion of the transverse cross-sectional configuration of the composite product connected to apply a uniform layer of coating material in the plastic state to the moving strand material, the second applicator orifice means being located closer to the strand path than the thickness of the layer which the second applicator means applies whereby coating material is transferred from the moving surface of the first applicator means to one side of the strand material and coating material is transferred by the second applicator means to another side of the strand material each with compressive forces sufficient to insure complete coating of the strand material with a minimum of interval voids.

10. Apparatus for manufacturing lengths of a composite product as in claim 9 wherein the endless surface is formed on the outer periphery of an essentially disc-shaped member, pivoted to move the surface along a circular path.

11. Apparatus for manufacturing lengths of a composite product taking the form of coated strand material comprising an endless surface mounted for continuous movement along an endless path, at least a portion of the path passing through a coating zone, means for insuring that the surface moves along a predetermined course at the portion of the path which passes through the coating zone, four stationary die surfaces mounted adjacent the moving endless surface in the coating zone, the first stationary die surface forming with the moving endless surface a seal which generally defines the beginning of the coating zone, the second stationary die surface forming with the moving endless surface an extrusion orifice for coating material, the third stationary die surface forming a feed guide for strand material, and the fourth stationary die surface forming another extrusion orifice for coating material which generally defines the end of the coating zone.

12. Apparatus for manufacturing lengths of a composite product as in claim 11 wherein a first coating material feed channel is directed to the coating zone at a position between the first and the second stationary die surfaces, a second coating material feed channel is directed to the coating zone at a position between the third and the fourth stationary die surfaces, and a strand material feed channel is directed to the coating zone at a position between the second and the third stationary die surfaces.

13. Apparatus for manufacturing lengths of a composite product as in claim 12 wherein the second die surface is spaced a small predetermined distance from the moving endless surface, the third stationary die surface is spaced a slightly greater distance from the moving endless surface than the second stationary die surface, and the fourth stationary die surface is spaced a slightly greater distance from the moving endless surface than the third stationary die surface.

14. Apparatus for manufacturing lengths of a composite product as in claim 13 wherein the moving endless surface is formed on the outer periphery of an essentially disc-shaped member, pivoted to move the surface along a circular path, and wherein at least the first, the second and the fourth stationary die surfaces are arcuate in form to correspond with the curvature of the endless surface.

15. Apparatus for manufacturing lengths of a composite product as in claim 13 wherein the four stationary die surfaces are formed on four separate and readily replaceable insert elements, one die surface being formed on each element, and the first and the second coating material feed channels are formed as cut-out portions of the insert elements.

16. Apparatus for manufacturing lengths of a composite product as in claim 15 wherein the moving endless surface is formed on the outer periphery of an essentially disc-shaped member, pivoted to move the surface along a circular path, and wherein at least the first, the second and the fourth stationary die surfaces are arcuate in form to correspond with the curvature of the endless surface.

17. Apparatus for manufacturing lengths of a composite product as in claim 16 wherein the strand material feed channel is located between the first and the second coating material feed channels adjacent the coating zone, and the first and the second coating material feed channels join with a common coating material feed channel at a point remote from the coating zone whereby a single source of pressurized coating material is utilized.

References Cited by the Examiner

UNITED STATES PATENTS

| | | | |
|---|---|---|---|
| 1,800,179 | 4/1931 | Darrow | 156—440 X |
| 2,072,105 | 3/1937 | Fischer | 156—244 |
| 2,091,124 | 8/1937 | Stewart | 156—244 |
| 2,944,586 | 7/1960 | Yanulis | 156—244 X |
| 3,127,306 | 3/1964 | Turton et al. | 161—89 |

EARL M. BERGERT, *Primary Examiner.*

T. R. SAVOIE, *Assistant Examiner.*